US011462802B2

United States Patent
Lee et al.

(10) Patent No.: US 11,462,802 B2
(45) Date of Patent: Oct. 4, 2022

(54) COMPOSITION FOR MANUFACTURING SECONDARY BATTERY SEPARATOR AND SECONDARY BATTERY INCLUDING THE SAME

(71) Applicants: SK Innovation Co., Ltd., Seoul (KR); SK Lubricants Co., Ltd., Seoul (KR)

(72) Inventors: Hyeung-Jin Lee, Daejeon (KR); Hwan-Kyu Jung, Daejeon (KR); Hyo-Shin Kwak, Daejeon (KR); Sang-Hye Shin, Daejeon (KR)

(73) Assignees: SK Innovation Co., Ltd., Seoul (KR); SK Lubricants Co., Ltd., Seoul (KR)

( * ) Notice: Subject to any disclaimer, the term of this patent is extended or adjusted under 35 U.S.C. 154(b) by 375 days.

(21) Appl. No.: 16/470,287

(22) PCT Filed: Dec. 12, 2017

(86) PCT No.: PCT/KR2017/014526
§ 371 (c)(1),
(2) Date: Jun. 17, 2019

(87) PCT Pub. No.: WO2018/117515
PCT Pub. Date: Jun. 28, 2018

(65) Prior Publication Data
US 2019/0312248 A1    Oct. 10, 2019

(30) Foreign Application Priority Data
Dec. 21, 2016    (KR) .................. 10-2016-0175884

(51) Int. Cl.
*H01M 50/403*    (2021.01)
*H01M 50/409*    (2021.01)
(Continued)

(52) U.S. Cl.
CPC ............ *H01M 50/403* (2021.01); *C08J 5/18* (2013.01); *C08J 9/0038* (2013.01); *C08K 3/22* (2013.01);
(Continued)

(58) Field of Classification Search
None
See application file for complete search history.

(56) References Cited

U.S. PATENT DOCUMENTS 6,704,192 B2    3/2004   Pekala
8,057,718 B2   11/2011   Lee et al.
(Continued)

FOREIGN PATENT DOCUMENTS

CN    1565038 A     1/2005
CN  101466784 A     6/2009
(Continued)

*Primary Examiner* — Lisa S Park
(74) *Attorney, Agent, or Firm* — The Webb Law Firm

(57) ABSTRACT

The present disclosure relates to a composition for manufacturing a secondary battery separator having excellent electrical conductivity and capable of minimizing occurrence of black scum on an electrode and a secondary battery thereof. The composition for manufacturing a secondary battery separator according to the present disclosure includes a polyethylene resin and an ionic liquid lubricant composition. The ionic liquid lubricant composition includes a pore-controlling agent, an ionic liquid, and paraffinic oil.

8 Claims, 1 Drawing Sheet

(51) Int. Cl.
  *H01M 50/40* (2021.01)
  *H01M 10/04* (2006.01)
  *C08K 3/22* (2006.01)
  *C08K 3/36* (2006.01)
  *C08L 91/00* (2006.01)
  *C08J 9/00* (2006.01)
  *C08K 5/42* (2006.01)
  *C08J 5/18* (2006.01)
  *C08K 5/19* (2006.01)
  *C08K 5/50* (2006.01)
  *H01M 50/446* (2021.01)

(52) U.S. Cl.
  CPC .............. *C08K 3/36* (2013.01); *C08K 5/19* (2013.01); *C08K 5/42* (2013.01); *C08K 5/50* (2013.01); *C08L 91/00* (2013.01); *H01M 10/04* (2013.01); *H01M 50/40* (2021.01); *H01M 50/409* (2021.01); *H01M 50/446* (2021.01); *C08J 2201/02* (2013.01); *C08J 2323/06* (2013.01); *C08K 2003/2227* (2013.01); *C08K 2003/2231* (2013.01); *C08K 2003/2241* (2013.01); *C08K 2201/005* (2013.01)

(56) References Cited

U.S. PATENT DOCUMENTS

| | | | |
|---|---|---|---|
| 9,214,659 B2 | 12/2015 | Horpel et al. | |
| 9,418,019 B2 | 8/2016 | Lepak et al. | |
| 2004/0260001 A1* | 12/2004 | Lin | C08L 23/20 524/474 |
| 2006/0100323 A1* | 5/2006 | Schmidt | C08K 5/19 524/106 |
| 2006/0228540 A1* | 10/2006 | Lee | C08J 5/18 428/317.9 |
| 2007/0116944 A1 | 5/2007 | Lee et al. | |
| 2008/0138700 A1 | 6/2008 | Horpel et al. | |
| 2012/0178658 A1 | 7/2012 | Tredget | |
| 2015/0037692 A1* | 2/2015 | Park | H01M 50/1385 429/405 |
| 2016/0064712 A1 | 3/2016 | Hoerpel et al. | |
| 2019/0023819 A1* | 1/2019 | Schmid | C08K 3/04 |

FOREIGN PATENT DOCUMENTS

| | | |
|---|---|---|
| JP | 2013503957 A | 2/2013 |
| KR | 20030035414 A | 5/2003 |
| KR | 1020060106102 A | 10/2006 |
| KR | 1020070012833 A | 1/2007 |
| KR | 1020080020742 A | 3/2008 |
| KR | 1020150079413 A | 7/2015 |
| KR | 1020160109391 A | 9/2016 |

* cited by examiner

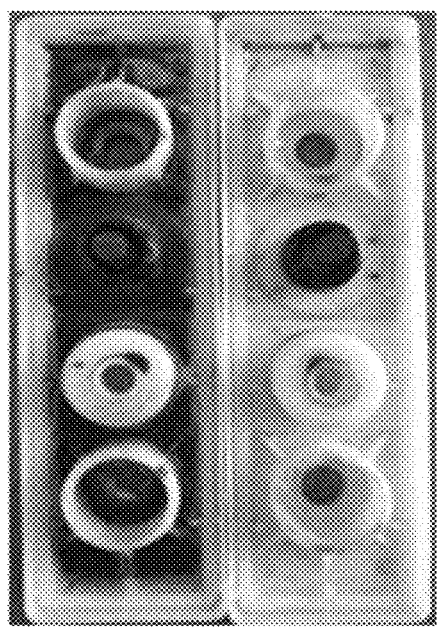
Comparative Example 1    Example 2

COMPOSITION FOR MANUFACTURING SECONDARY BATTERY SEPARATOR AND SECONDARY BATTERY INCLUDING THE SAME

CROSS-REFERENCE TO RELATED APPLICATIONS

This application is the United States national phase of International Application No. PCT/KR2017/014526 filed Dec. 12, 2017, and claims priority to Korean Patent Application No. 10-2016-0175884 filed Dec. 21, 2016, the disclosures of which are hereby incorporated by reference in their entirety.

BACKGROUND

1. Technical Field

The present disclosure relates to a composition for manufacturing a secondary battery separator and a secondary battery thereof, and more particularly, to a composition for manufacturing a secondary battery separator having excellent electrical conductivity and capable of minimizing occurrence of black scum on an electrode and a secondary battery thereof.

2. Description of the Related Art

A process oil used in manufacturing a lead-acid battery separator, which is one of secondary batteries, is extracted in an amount of about 85% in a manufacturing process and removed, and the remaining 15% of the oil remains as it is in a final product. The remaining oil adversely affects performance of the final battery. Accordingly, the process oil used in manufacturing the lead-acid battery separator has a great influence on not only performance of the separator but also performance and stability of the lead-acid battery.

In general, naphthene oil or aromatic oil is largely used as the process oil for a lead-acid battery. However, the naphthene oil or the aromatic oil has a problem in that black scum occurs according to charging and discharging at the electrode to thereby deteriorate the performance of the battery.

SUMMARY

It is an object of the present disclosure to provide a composition for manufacturing a secondary battery separator capable of improving electrical conductivity and workability while minimizing occurrence of black scum, and a secondary battery thereof.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a composition for manufacturing a secondary battery separator includes: a polyethylene resin and an ionic liquid lubricant composition, wherein the ionic liquid lubricant composition includes a pore-controlling agent, an ionic liquid, and paraffinic oil.

BRIEF DESCRIPTION OF DRAWINGS

FIG. 1 is an image showing whether black scum occurs by charging single batteries using lubricant compositions according to Comparative Example 1 and Example 2.

DETAILED DESCRIPTION

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Hereinafter, a composition for manufacturing a secondary battery separator according to a preferred embodiment of the present disclosure and a secondary battery thereof will be described in detail with reference to the accompanying drawings.

Composition for Manufacturing Secondary Battery Separator

The composition for manufacturing a secondary battery separator according to an exemplary embodiment of the present disclosure includes a polyethylene resin and an ionic liquid lubricant composition, wherein the ionic liquid lubricant composition includes a pore-controlling agent, an ionic liquid, and paraffinic oil.

More specifically, the composition for manufacturing a secondary battery separator according to an exemplary embodiment of the present disclosure includes 15 to 30 wt % of the polyethylene resin, 30 to 50 wt % of the pore-controlling agent, 0.1 to 10 wt % of the ionic liquid, and 20 to 50 wt % of the paraffin oil.

That is, the composition for manufacturing a secondary battery separator according to an exemplary embodiment of the present disclosure may minimize occurrence of black scum on an electrode by adding paraffinic oil as a main component while securing excellent electrical conductivity and workability by adding an ionic liquid having excellent electrical conductivity and silica which is a pore-control agent for controlling pores.

Here, the polyethylene resin preferably has a weight average molecular weight (Mw) of 300,000 to 700,000. When the weight average molecular weight of the polyethylene resin is less than 300,000, it is not preferable since tensile strength and puncture strength are lowered. On the contrary, when the weight average molecular weight of the polyethylene resin is more than 700,000, high cost is required and there is a problem in kneading at the time of extrusion.

It is preferable to add the polyethylene resin at a content ratio of 15 to 30 wt %, based on the total weight of the composition for manufacturing a secondary battery separator. When the added content of the polyethylene resin is less than 15 wt %, it may be difficult to manufacture a gel sheet. On the contrary, when the added content of the polyethylene resin is more than 30 wt %, there may be a problem in that porosity may remarkably decrease.

Here, the paraffinic oil includes 60% or more of paraffinic hydrocarbon in order to minimize occurrence of black scum and to increase electrical conductivity and workability. Further, the paraffinic oil is more preferably a base oil including 0.03 wt % or less of sulfur (S).

It is preferable to add the pore-controlling agent at a content ratio of 30 to 50 wt %, based on the total weight of the composition for manufacturing a secondary battery separator. When the added content of the pore-controlling agent is less than 30 wt %, it is difficult to form uniform pores since the content thereof is excessively small. On the contrary, when the added content of the pore-controlling agent is more than 50 wt %, the content thereof is excessively large, and thus, solubility to oil may be lowered, which may cause problems such as haze phenomenon, precipitation, etc.

As the pore-controlling agent, at least one selected from silica, titanium dioxide, alumina, and tin oxide may be used, and among them, silica is more preferably used.

The pore-controlling agent preferably has an average particle size of 100 nm to 30 μm. When the average particle size of the pore-controlling agent is less than 100 nm, it may be difficult to manufacture uniform porous particles, and since the particle size and the pore size become similar, it may be difficult to maintain the porous structure of the separator for a long period of time. On the contrary, when the average particle size of the pore-controlling agent is more than 30 μm, it is not preferred since the particle size is excessively large, it is difficult to maintain a uniform pore size, and performance and durability are easily deteriorated due to the formation of big pores.

The ionic liquid is added for the purpose of improving electrical conductivity. To this end, the ionic liquid is preferably added at a content ratio of 0.1 to 10 wt %, more preferably 0.1 to 5.0 wt %, based on the total weight of the composition for manufacturing a secondary battery separator. Here, it is confirmed through experiments that when the ionic liquid is added in an excessively large content or is added in an excessively small content which is out of the above-described range, an effect of improving the electric conductivity is insignificant.

In particular, the ionic liquid according to an exemplary embodiment of the present disclosure includes a cation including any one of tetra alkyl ammonium and tetra alkyl phosphonium, and an anion including any one of sulfonate and phosphate.

Preferably, the cation included in the ionic liquid according to the exemplary embodiment of the present disclosure may have a structure represented by Chemical Formula 1 below:

[Chemical Formula 1]

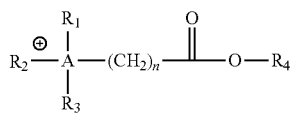

in Chemical Formula 1, A means any one element of nitrogen (N), phosphorus (P), and sulfur (S), and n has a range of $1 \leq n \leq 20$.

In Chemical Formula 1, R1, R2, R3, and R4 are each independently selected from hydrogen, (C1-C20)alkyl, (C6-C30) aryl, (C1-C20)alkoxy, (C3-C20)cycloalkyl, (C2-C7) alkenyl, (C1-C10)alkoxycarbonyl(C1-C20)alkyl, carbonyl (C1-C20)alkyl, (C3-C20)heterocycloalkyl, and (C4-C20) heteroaryl, or R1, R2, R3, and R4 are not simultaneously hydrogen, and the alkyl, aryl, alkoxy, cycloalkyl, alkenyl, alkoxycarbonylalkyl, carbonylalkyl, heterocycloalkyl, heteroaryl of the R1, R2, R3, and R4 may be further substituted with one or more selected from (C1-C20)alkyl, halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

Further, the cation included in the ionic liquid according to the exemplary embodiment of the present disclosure may have any one of a structure represented by Chemical Formula 2 and a structure represented by Chemical Formula 3:

[Chemical Formula 2]

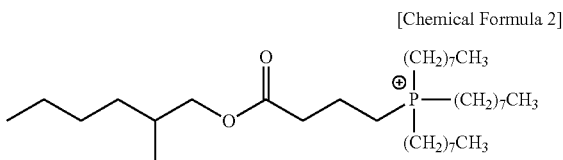

[Chemical Formula 3]

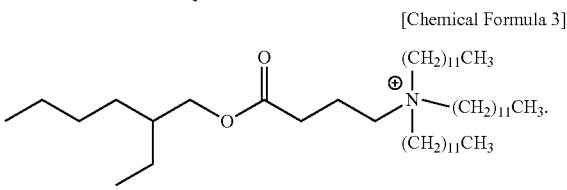

Here, the specific cation represented by Chemical Formula 2 includes tetra alkyl phosphonium and the specific cation represented by Chemical Formula 3 includes tetra alkyl ammonium.

The specific cations having the structures of Chemical Formulas 2 and 3 according to the present disclosure are designed to have specific chain lengths and structures, and are particularly capable of combining with specific anions according to the present disclosure with excellent property. Accordingly, the ionic liquid according to the present disclosure has excellent physicochemical properties such as hydrophilicity/hydrophobicity, solubility, polarity, viscosity, and density, etc.

Meanwhile, the anion included in the ionic liquid according to the exemplary embodiment of the present disclosure may have a structure represented by Chemical Formula 4 below:

[Chemical Formula 4]

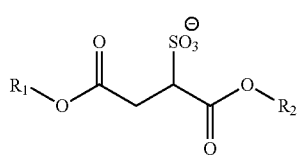

in Chemical Formula 4, R1 and R2 are each independently selected from hydrogen, (C1-C20)alkyl, (C6-C30) aryl, (C1-C20)alkoxy, (C3-C20)cycloalkyl, (C2-C7)alkenyl, (C1-C10)alkoxycarbonyl(C1-C20)alkyl, carbonyl(C1-C20) alkyl, (C3-C20)heterocycloalkyl, and (C4-C20)heteroaryl, or R1 and R2 are not simultaneously hydrogen, and the alkyl, aryl, alkoxy, cycloalkyl, alkenyl, alkoxycarbonylalkyl, carbonylalkyl, heterocycloalkyl, heteroaryl of the R1 and R2 may be further substituted with one or more selected from (C1-C20)alkyl, halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

Further, the anion included in the ionic liquid according to the exemplary embodiment of the present disclosure may have a structure represented by Chemical Formula 5 below:

[Chemical Formula 5]

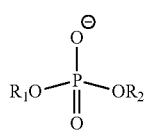

in Chemical Formula 5, R1 and R2 are each independently selected from hydrogen, (C1-C20)alkyl, (C6-C30)aryl, (C1-C20)alkoxy, (C3-C20)cycloalkyl, (C2-C7)alkenyl, (C1-C10)alkoxycarbonyl(C1-C20)alkyl, carbonyl(C1-C20)alkyl, (C3-C20)heterocycloalkyl, and (C4-C20)heteroaryl, or R1 and R2 are not simultaneously hydrogen, and the alkyl, aryl, alkoxy, cycloalkyl, alkenyl, alkoxycarbonylalkyl, carbonylalkyl, heterocycloalkyl, heteroaryl of the R1 and R2 may be further substituted with one or more selected from (C1-C20)alkyl, halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

The composition for manufacturing a secondary battery separator according to the exemplary embodiment of the present disclosure as described above may have excellent electrical conductivity and remarkably reduce occurrence of black scum on the electrode by applying the paraffinic oil having excellent evaporation loss and oxidation stability unlike the naphthene oil and the aromatic oil, as a base oil, and by adding the ionic liquid having excellent electrical conductivity and the silica which is a pore-controlling agent for controlling pores at an optimum content ratio.

Hereinafter, a method of manufacturing a polyethylene porous film for a secondary battery separator according to an exemplary embodiment of the present disclosure will be briefly described.

The method of manufacturing a polyethylene porous film for a secondary battery separator according to an exemplary embodiment of the present disclosure includes melting and kneading a composition for manufacturing a secondary battery separator including a polyethylene resin and an ionic liquid lubricant composition, compressing the mixture, followed by cooling to form a gel composition.

Next, the gel composition is biaxially stretched, followed by heat setting to manufacture a polyethylene porous film.

Here, the polyethylene resin preferably has a weight average molecular weight (Mw) of 300,000 to 700,000. When the weight average molecular weight of the polyethylene resin is less than 300,000, it is not preferable since tensile strength and puncture strength are lowered. On the contrary, when the weight average molecular weight of the polyethylene resin is more than 700,000, high cost is required and there is a problem in kneading at the time of extrusion.

Here, it is preferable that the composition for manufacturing a secondary battery separator includes 15 to 30 wt % of the polyethylene resin, 30 to 50 wt % of the pore-controlling agent, 0.1 to 10 wt % of the ionic liquid, and 20 to 50 wt % of the paraffinic oil.

Example

Hereinafter, constitution and function of the present disclosure will be described in more detail through preferable exemplary embodiments of the present disclosure. It is to be noted that Examples to be described below are provided merely for specifically exemplifying the present disclosure, and accordingly, the present disclosure is not limited to the following Examples.

Descriptions which are not described in the specification can be sufficiently and technically deduced by a person skilled in the technical field, and accordingly, details thereof will be omitted.

1. Preparation of Composition for Manufacturing Secondary Battery Separator

Compositions for manufacturing secondary battery separators according to Examples 1 to 23 and Comparative Examples 1 to 24 were prepared with the compositions shown in Tables 1 to 3.

TABLE 1

(Unit: wt %)

| Classification | Example 1 | Example 2 | Example 3 | Example 4 | Example 5 | Example 6 | Example 7 | Example 8 |
|---|---|---|---|---|---|---|---|---|
| Polyethylene resin | 20.0 | 20.0 | 20.0 | 20.0 | 20.0 | 20.0 | 20.0 | 20.0 |
| Paraffinic oil | 39.5 | 39.0 | 37.0 | 35.0 | 39.9 | 39.0 | 37.0 | 30.0 |
| Silica | 40.0 | 40.0 | 40.0 | 40.0 | 40.0 | 40.0 | 40.0 | 40.0 |
| Ionic liquid (Chemical Formulas 1 + 4) | 0.5 | 1.0 | 3.0 | 5.0 | — | — | — | — |
| Ionic liquid (Chemical Formulas 1 + 5) | — | — | — | — | 0.1 | 1.0 | 3.0 | 10.0 |

| Classification | Example 9 | Example 10 | Example 11 | Example 12 | Example 13 | Example 14 | Example 15 |
|---|---|---|---|---|---|---|---|
| Polyethylene resin | 20.0 | 20.0 | 20.0 | 20.0 | 20.0 | 20.0 | 20.0 |
| Paraffinic oil | 39.5 | 39.0 | 37.0 | 35.0 | 39.9 | 38.0 | 35.0 |
| Silica | 40.0 | 40.0 | 40.0 | 40.0 | 40.0 | 40.0 | 40.0 |
| Ionic liquid (Chemical Formulas 2 + 4) | 0.5 | 1.0 | 3.0 | 5.0 | — | — | — |
| Ionic liquid (Chemical Formulas 2 + 5) | — | — | — | — | 0.1 | 2.0 | 5.0 |

TABLE 1-continued (Unit: wt %)

| Classification | Example 16 | Example 17 | Example 18 | Example 19 | Example 20 | Example 21 | Example 22 | Example 23 |
|---|---|---|---|---|---|---|---|---|
| Polyethylene resin | 20.0 | 20.0 | 20.0 | 20.0 | 20.0 | 20.0 | 20.0 | 20.0 |
| Paraffinic oil | 39.5 | 39.0 | 37.0 | 30.0 | 39.9 | 39.5 | 37.0 | 35.0 |
| Silica | 40.0 | 40.0 | 40.0 | 40.0 | 40.0 | 40.0 | 40.0 | 40.0 |
| Ionic liquid (Chemical Formulas 3 + 4) | 0.5 | 1.0 | 3.0 | 10.0 | — | — | — | — |
| Ionic liquid (Chemical Formulas 3 + 5) | — | — | — | — | 0.1 | 0.5 | 3.0 | 5.0 |

TABLE 2

(Unit: wt %)

| Classification | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Polyethylene resin | 20.0 | 20.0 | 20.0 | 20.0 | 20.0 | 20.0 | 20.0 | 20.0 |
| Naphthene oil | 40.0 | — | 39.999 | — | 39.999 | — | 39.999 | — |
| Aromatic oil | — | 40.0 | — | 39.999 | — | 39.999 | — | 39.999 |
| Silica | 40.0 | 40.0 | 40.0 | 40.0 | 40.0 | 40.0 | 40.0 | 40.0 |
| Ionic liquid (Chemical Formulas 1 + 4) | — | — | 0.001 | 0.001 | — | — | — | — |
| Ionic liquid (Chemical Formulas 1 + 5) | — | — | — | — | 0.001 | 0.001 | — | — |
| Ionic liquid (Chemical Formulas 2 + 4) | — | — | — | — | — | — | 0.001 | 0.001 |

| Classification | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Polyethylene resin | 20.0 | 20.0 | 20.0 | 20.0 | 20.0 | 20.0 | 20.0 | 20.0 |
| Naphthene oil | 39.999 | — | 39.999 | — | 28.0 | — | 28.0 | — |
| Aromatic oil | — | 39.999 | — | 39.999 | — | 25.0 | — | 25.0 |
| Silica | 40.0 | 40.0 | 40.0 | 40.0 | 40.0 | 40.0 | 40.0 | 40.0 |
| Ionic liquid (Chemical Formulas 2 + 5) | 0.001 | 0.001 | — | — | — | — | — | — |
| Ionic liquid (Chemical Formulas 3 + 4) | — | — | 0.001 | 0.001 | — | — | — | — |
| Ionic liquid (Chemical Formulas 1 + 5) | — | — | — | — | 12.0 | 15.0 | — | — |

TABLE 2-continued (Unit: wt %)

| | | | | | | | | 12.0 | 15.0 |
|---|---|---|---|---|---|---|---|---|---|
| Ionic liquid (Chemical Formulas 2 + 4) | — | — | — | — | — | — | 12.0 | 15.0 |

TABLE 3

(Unit: wt %)

| Classification | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|
| Polyethylene resin | 20.0 | 20.0 | 20.0 | 20.0 | 20.0 | 20.0 | 20.0 | 20.0 |
| Naphthene oil | 28.0 | — | 28.0 | — | — | — | — | — |
| Aromatic oil | — | 25.0 | — | 25.0 | — | — | — | — |
| Paraffinic oil | — | — | — | — | 25.0 | 39.999 | 25.0 | 39.999 |
| Silica | 40.0 | 40.0 | 40.0 | 40.0 | 40.0 | 40.0 | 40.0 | 40.0 |
| Ionic liquid (Chemical Formulas 2 + 5) | 12.0 | 15.0 | — | — | — | — | — | 0.001 |
| Ionic liquid (Chemical Formulas 3 + 4) | — | — | 12.0 | 15.0 | — | — | — | — |
| Ionic liquid (Chemical Formulas 1 + 4) | — | — | — | — | 15.0 | — | — | — |
| Ionic liquid (Chemical Formulas 1 + 5) | — | — | — | — | — | 0.001 | — | — |
| Ionic liquid (Chemical Formulas 2 + 4) | — | — | — | — | — | — | 15.0 | — |

2. Evaluation of Physical Properties

Tables 4 and 5 show the results obtained by evaluating physical properties of single batteries using the compositions for manufacturing secondary battery separators according to Examples 1 to 23 and Comparative Examples 1 to 24.

1) Charging of Single Battery

The single batteries were assembled, and initially charged in a sulfuric acid solution having a specific gravity of 1.080 at 6 A for 7.5 hours. Then, the batteries were over-charged under conditions of 75° C., 5 A DC, and for 100 hours after replacing with a sulfuric acid solution having a specific gravity of 1.325.

2) Sulfuric Acid Color Test

The sulfuric acid color test was performed by mixing 12 ml of sulfuric acid having a specific gravity of 1.510 (60 wt % $H_2SO_4$ aqueous solution) with 12 ml of oil, warming up the mixture in a water tank (90° C.), followed by shaking in every 2 minutes. Then, the mixture was heated for 20 minutes, allowed to stand at room temperature for 3 days, and the degree of discoloration was then confirmed.

3) Evaporation Test

In the case of the evaporation loss, the evaluation was performed by using a rotary evaporator for 1 hour at 70 ml, 100 rpm, and 180° C. to confirm the loss.

4) Measurement of Electrical Resistance

In order to confirm the performance of the lead battery separator, conductivity was measured, wherein a single battery was assembled, the battery was initially charged in a dilute sulfuric acid solution having a specific gravity of 37% (the remaining 63% was filled with $H_2O$) at 6 A for 7.5 hours. Then, the electrolyte was replaced and the electric resistance was then measured while flowing a constant current (6 A).

TABLE 4

| Classification | Example 1 | Example 2 | Example 3 | Example 4 | Example 5 | Example 6 | Example 7 | Example 8 |
|---|---|---|---|---|---|---|---|---|
| Sulfuric acid color test | Good discoloration | Good discoloration | Good discoloration | Good discoloration | Good discoloration | Good discoloration | Good discoloration | Good discoloration |

TABLE 4-continued

| | | | | | | | | | |
|---|---|---|---|---|---|---|---|---|---|
| Evaporation test | Evaporation loss (%) | 0.8 | 0.9 | 0.9 | 0.8 | 0.9 | 0.9 | 0.9 | 0.8 |
| | Color change | None | None | None | None | None | None | None | None |
| | Electrical resistance (mΩ · dm$^2$): ER | 1.02 | 1.03 | 1.00 | 1.02 | 1.03 | 1.00 | 1.00 | 1.02 |
| | Workability | Good | Good | Good | Good | Good | Good | Good | Good |
| | Charging of single battery (5 A, 100 Hr) | No scum | No scum | No scum | Scum occurred | No scum | No scum | No scum | Scum occurred |

| Classification | Example 9 | Example 10 | Example 11 | Example 12 | Example 13 | Example 14 | Example 15 | Example 16 |
|---|---|---|---|---|---|---|---|---|
| Sulfuric acid color test | Good discoloration | Good discoloration | Good discoloration | Good discoloration | Good discoloration | Good discoloration | Good discoloration | Good discoloration |
| Evaporation test — Evaporation loss (%) | 0.9 | 0.9 | 0.9 | 0.8 | 0.9 | 0.9 | 0.9 | 0.8 |
| Color change | None | None | None | None | None | None | None | None |
| Electrical resistance (mΩ · dm$^2$): ER | 1.03 | 1.03 | 1.00 | 1.02 | 1.03 | 1.03 | 1.00 | 1.02 |
| Workability | Good | Good | Good | Good | Good | Good | Good | Good |
| Charging of single battery (5 A, 100 Hr) | No scum | No scum | No scum | Scum occurred | No scum | No scum | No scum | Scum occurred |

| Classification | Example 17 | Example 18 | Example 19 | Example 20 | Example 21 | Example 22 | Example 23 |
|---|---|---|---|---|---|---|---|
| Sulfuric acid color test | Good discoloration | Good discoloration | Good discoloration | Good discoloration | Good discoloration | Good discoloration | Good discoloration |
| Evaporation test — Evaporation loss (%) | 0.9 | 0.9 | 0.9 | 0.8 | 0.9 | 0.9 | 0.9 |
| Color change | None | None | None | None | None | None | None |
| Electrical resistance (mΩ · dm$^2$): ER | 1.03 | 1.00 | 1.00 | 1.02 | 1.03 | 1.03 | 1.00 |
| Workability | Good | Good | Good | Good | Good | Good | Good |
| Charging of single battery (5 A, 100 Hr) | No scum | No scum | No scum | Scum occurred | No scum | No scum | No scum |

TABLE 5

| Classification | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Sulfuric acid color test | Discoloration occurred | Discoloration occurred | Discoloration occurred | Discoloration occurred | Discoloration occurred | Discoloration occurred | Discoloration occurred | Discoloration occurred |
| Evaporation test — Evaporation loss (%) | 1.8 | 1.7 | 1.5 | 1.8 | 1.7 | 1.5 | 1.8 | 1.8 |
| Color change | Yes | Yes | Yes | Yes | Yes | Yes | Yes | Yes |
| Electrical resistance (mΩ · dm$^2$): ER | 1.24 | 1.26 | 1.25 | 1.25 | 1.24 | 1.26 | 1.25 | 1.25 |

TABLE 5-continued

| | | | | | | | | |
|---|---|---|---|---|---|---|---|---|
| Workability | Good | Good | Good | Good | Good | Good | Good | Good |
| Charging of single battery (5 A, 100 Hr) | Scum occurred | Scum occurred | Scum occurred | Scum occurred | Scum occurred | Scum occurred | Scum occurred | Scum occurred |

| Classification | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|
| Sulfuric acid color test | Discoloration occurred | Discoloration occurred | Discoloration occurred | Discoloration occurred | Discoloration occurred | Discoloration occurred | Discoloration occurred | Discoloration occurred |
| Evaporation test — Evaporation loss (%) | 1.7 | 1.5 | 1.8 | 1.8 | 1.7 | 1.5 | 1.8 | 1.8 |
| Color change | Yes | Yes | Yes | Yes | Yes | Yes | Yes | Yes |
| Electrical resistance ($m\Omega \cdot dm^2$): ER | 1.24 | 1.26 | 1.25 | 1.25 | 1.24 | 1.26 | 1.25 | 1.25 |
| Workability Charging of single battery (5 A, 100 Hr) | Good Scum occurred | Good Scum occurred | Good Scum occurred | Good Scum occurred | Good Scum occurred | Good Scum occurred | Good Scum occurred | Good Scum occurred |

| Classification | Comparative Example 17 | Comparative Example 18 | Comparative Example 19 | Comparative Example 20 | Comparative Example 21 | Comparative Example 22 | Comparative Example 23 | Comparative Example 24 |
|---|---|---|---|---|---|---|---|---|
| Sulfuric acid color test | Discoloration occurred | Discoloration occurred | Discoloration occurred | Good discoloration | Good discoloration | Good discoloration | Good discoloration | Good discoloration |
| Evaporation test — Evaporation loss (%) | 1.7 | 1.5 | 1.8 | 1.9 | 0.9 | 0.9 | 0.9 | 0.9 |
| Color change | None | None | None | None | None | None | None | None |
| Electrical resistance ($m\Omega \cdot dm^2$): ER | 1.24 | 1.26 | 1.25 | 1.25 | 1.24 | 1.26 | 1.25 | 1.26 |
| Workability Charging of single battery (5 A, 100 Hr) | Good Scum occurred | Good Scum occurred | Good Scum occurred | Good Scum occurred | Good Scum occurred | Good Scum occurred | Good Scum occurred | Good Scum occurred |

As shown in Tables 1 to 5, it was confirmed that as compared to Comparative Examples 1 to 20 using naphthene oil and aromatic oil, Examples 1 to 23 showed excellent evaporation loss and oxidation stability, and significantly reduced electric resistance to have excellent electrical conductivity.

Further, it was confirmed that in Comparative Examples 21 to 24 in which even though the paraffinic oil was used, the added content of the ionic liquid was out of the range suggested by the present disclosure, the evaporation loss and the oxidation stability were excellent, but the electric resistance was significantly high as 1.24 to 1.26 $m\Omega \cdot dm^2$, and thus the electrical conductivity was not good.

Meanwhile, FIG. 1 is an image showing whether black scum occurs by charging the single batteries using the lubricant compositions according to Comparative Example 1 and Example 2.

As shown in FIG. 1, it could be confirmed that when the lubricant composition according to Comparative Example 1 was used, the black scum severely occurred. On the other hand, it could be confirmed that when the lubricant composition according to Example 1 was used, the black scum did not occur.

The composition for manufacturing a secondary battery separator according to the present disclosure and the secondary battery thereof may have excellent electrical conductivity and remarkably reduce the occurrence of black scum on the electrode by applying the paraffinic oil having excellent evaporation loss and oxidation stability unlike the naphthene oil and the aromatic oil, as a base oil, and further, by adding the ionic liquid having excellent electrical conductivity and the silica which is a pore-controlling agent for controlling pores at an optimum content ratio.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A composition for manufacturing a polyethylene porous film of a secondary battery separator including:
    15 to 30 wt % of a polyethylene resin, 30 to 50 wt % of a pore-controlling agent, 0.1 to 10 wt % of an ionic liquid, and 20 to 50 wt % of paraffinic oil,
    wherein the pore-controlling agent includes silica, and wherein the polyethylene resin has a weight average molecular weight (Mx) of 300,000 to 700,000, wherein the ionic liquid includes a cation including any one of tetra alkyl ammonium and tetra alkyl phosphonium, and an anion including any one of sulfonate and phosphate, wherein the anion has a structure represented by Chemical Formula 4:

[Chemical Formula 4]

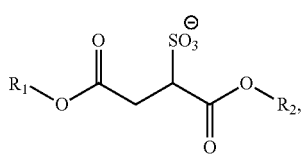

in Chemical Formula 4, R1 and R2 are each independently selected from hydrogen, (C1-C20)alkyl, (C6-C30)aryl, (C1-C20)alkoxy, (C3-C20)cycloalkyl, (C2-C7)alkenyl, (C1-C10)alkoxycarbonyl(C1-C20)alkyl, carbonyl(C1-C20)alkyl, (C3-C20)heterocycloalkyl, and (C4-C20)heteroaryl, or R1 and R2 are not simultaneously hydrogen, and the alkyl, aryl, alkoxy, cycloalkyl, alkenyl, alkoxycarbonylalkyl, carbonylalkyl, heterocycloalkyl, heteroaryl of the R1 and R2 are further substituted with one or more selected from (C1-C20)alkyl halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

2. The composition of claim 1, wherein the pore-controlling agent has an average particle size of 100 nm to 30 μm.

3. The composition of claim 1, wherein the paraffinic oil is a base oil including 0.03 wt % or less of sulfur (S).

4. The composition of claim 1, wherein the paraffinic oil includes 60% or more of paraffinic hydrocarbon.

5. The composition of claim 1, wherein the ionic liquid is added at a content of 0.1 to 5.0 wt %.

6. The composition of claim 1, wherein the cation has a structure represented by Chemical Formula 1 below:
[Chemical Formula 1]

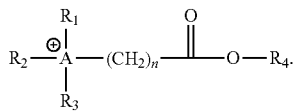

in Chemical Formula 1, A is any one element of nitrogen (N), phosphorus (P), and sulfur (S), and in Chemical Formula 1, 1≤n≤20, wherein R1, R2, R3, and R4 are each independently selected from hydrogen, (C1-C20)alkyl, (C6-C30)aryl, (C1-C20)alkoxy, (C3-C20)cycloalkyl, (C2-C7)alkenyl, (C1-C10) alkoxycarbonyl(C1-C20)alkyl, carbonyl(C1-C20)alkyl, (C3-C20)heterocycloalkyl, and (C4-C20) heteroaryl, or R1, R2, R3, and R4 are not simultaneously hydrogen, and the alkyl, aryl, alkoxy, cycloalkyl, alkenyl, alkoxycarbonylalkyl, carbonylalkyl, heterocycloalkyl, heteroaryl of the R1, R2, R3, and R4 are further substituted with one or more selected from (C1-C20)alkyl, halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

7. The composition of claim 1, wherein the cation has any one of a structure represented by Chemical Formula 2 and a structure represented by Chemical Formula 3:

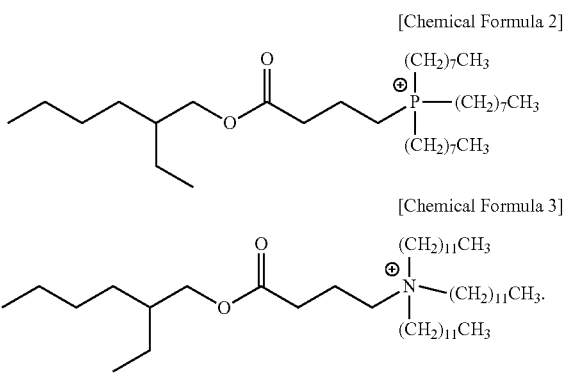

8. A composition for manufacturing a polyethylene porous film of a secondary battery separator including:
15 to 30 wt % of a polyethylene resin, 30 to 50 wt % of a pore-controlling agent, 0.1 to 10 wt % of an ionic liquid, and 20 to 50 wt % of paraffinic oil, wherein the pore-controlling agent includes silica, wherein the polyethylene resin has a weight average molecular weight (Mw) of 300,000 to 700,000, wherein the ionic liquid includes a cation including any one of tetra alkyl ammonium and tetra alkyl phosphonium, and an anion including any one of sulfonate and phosphate, wherein the anion has a structure represented by Chemical Formula 5:

[Chemical Formula 5]

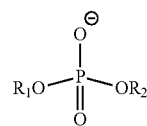

in Chemical Formula 5, R1 and R2 are each independently selected from hydrogen, (C1-C20)alkyl, (C6-C30)aryl, (C1-C20)alkoxy, (C3-C20)cycloalkyl, (C2-C7)alkenyl, (C1-C10)alkoxycarbonyl(C1-C20)alkyl, carbonyl(C1-C20)alkyl, (C3-C20)heterocycloalkyl, and (C4-C20)heteroaryl, or R1 and R2 are not simultaneously hydrogen, and the alkyl, aryl, alkoxy, cycloalkyl, alkenyl, alkoxycarbonylalkyl, carbonylalkyl, heterocycloalkyl, heteroaryl of the R1 and R2 are further substituted with one or more selected from (C1-C20)alkyl, halogen, nitro, cyano, hydroxy, amino, (C6-C20)aryl, (C2-C7)alkenyl, (C3-C20)cycloalkyl, (C3-C20)heterocycloalkyl, and (C4-C20)heteroaryl.

* * * * *

UNITED STATES PATENT AND TRADEMARK OFFICE
CERTIFICATE OF CORRECTION

PATENT NO. : 11,462,802 B2  
APPLICATION NO. : 16/470287  
DATED : October 4, 2022  
INVENTOR(S) : Hyeung-Jin Lee et al.

Page 1 of 1

It is certified that error appears in the above-identified patent and that said Letters Patent is hereby corrected as shown below:

In the Specification

Column 15, Line 29, Claim 1, delete "(C1-C20)alkyl" and insert -- (C1-C20)alkyl, --

Column 15, Lines 45-50, Claim 6, delete " 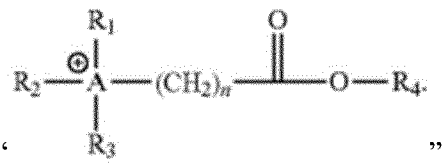 "

and insert -- 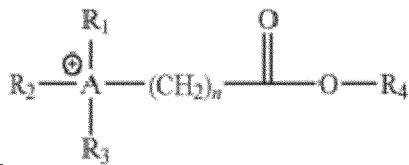 --

Signed and Sealed this  
Twenty-ninth Day of November, 2022

Katherine Kelly Vidal  
*Director of the United States Patent and Trademark Office*